Nov. 8, 1960 E. A. MEYER 2,959,259
FASTENER DEVICE

Filed Sept. 15, 1958 4 Sheets-Sheet 1

INVENTOR.
Engelbert A. Meyer
BY
L. D. Burch
ATTORNEY

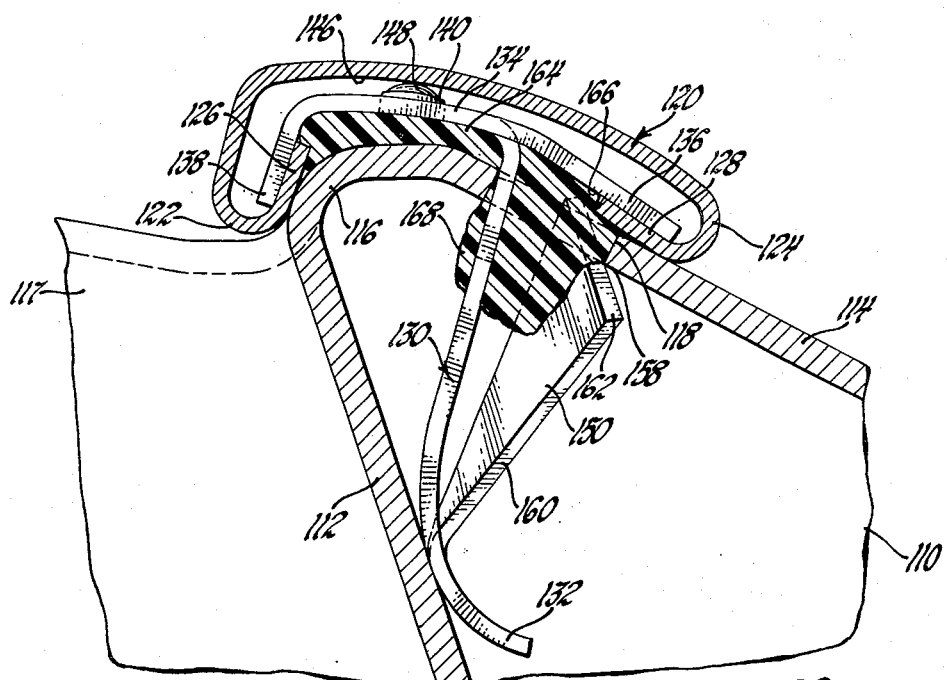
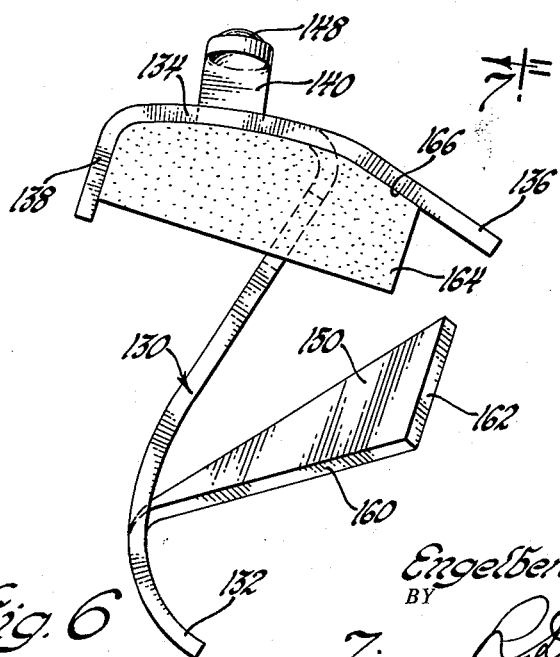

Nov. 8, 1960  E. A. MEYER  2,959,259
FASTENER DEVICE
Filed Sept. 15, 1958  4 Sheets-Sheet 4

INVENTOR.
Engelbert A. Meyer
BY
ATTORNEY a first side wall 12 and a second side wall 14 extending at an angle with respect to the wall 12, the junction of the two walls 12 and 14 forming the peak 16. An opening 18 in the side wall 14 receives a portion of the clip therein. In the usual motor vehicle installation, where the ornamental molding is in the form of a long strip, there would be a plurality of such openings 18 aligned across the vehicle panel and a plurality of clips to secure the strip thereto.

United States Patent Office 2,959,259
Patented Nov. 8, 1960

2,959,259

FASTENER DEVICE

Engelbert A. Meyer, Detroit, Mich., assignor to General Motors Corporation, Detroit, Mich., a corporation of Delaware Filed Sept. 15, 1958, Ser. No. 760,950

10 Claims. (Cl. 189—88)

This invention relates to fasteners and more particularly to a motor vehicle molding retainer clip for use on a motor vehicle having a peak panel forming a part thereof.

Fastening devices for securing molding strips on automobiles and the like have long been in common use. They permit installation of a continuous non-interrupted molding strip or the like with no fasteners showing, and they are readily and quickly installed from one side of a vehicle panel having an opening therein. The fasteners eliminate the necessity of access to the other side of the panel or the formation of a threaded or otherwise complicated opening.

It is increasingly difficult in automobile manufacture to adapt commercially available fasteners to the ever-changing automobile body design. Thus, it is generally necessary when an automobile is designed to design several new fasteners adaptable for a particular use.

The device in which this invention is embodied comprises a fastener device for use with an automobile having a panel in the form of a peak with an opening in one wall of the peak and an ornamental molding strip secured over the panel peak. It is proposed to provide a fastener which will retain the chrome strip on the motor vehicle in a secure and rigid manner and at the same time provide means for sealing the aperture through the peak wall and prevent the entrance of moisture or foreign matter to the interior of the motor vehicle body.

In the drawings:

Figure 5 is a cross sectional view of a different form of body peak and illustrates a modification of the fastening device in its installed position.

Figure 6 is a side view of the fastening device illustrated in Figure 5 and showing the free position thereof.

Figure 1:
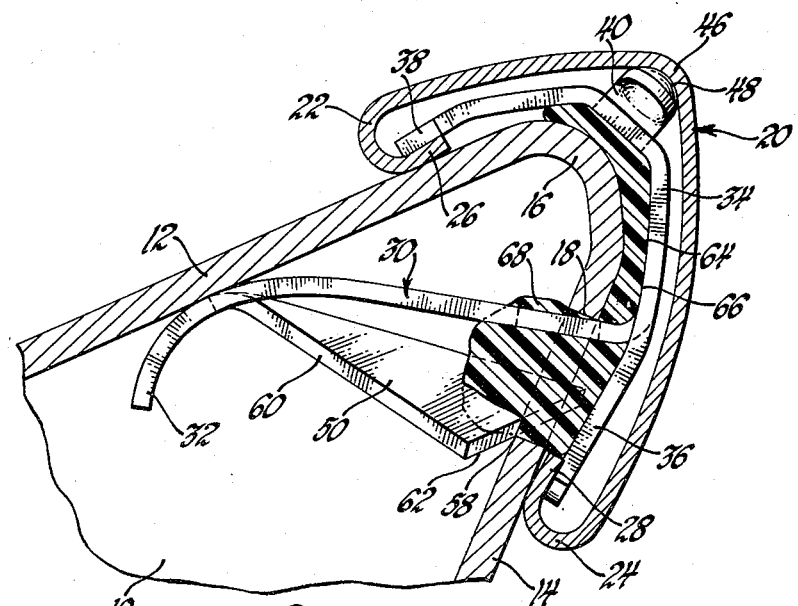
Figure 1 is a cross sectional view of a portion of a vehicle body having a peak therein, showing the fastening device and the molding strip retained on the body peak.

Referring more particularly to the drawings, Figure 1 shows a portion of a motor vehicle body with the fastener device and the ornamental molding strip mounted thereon. The vehicle body 10 includes a peak section having a first side wall 12 and a second side wall 14 extending at an angle with respect to the wall 12, the junction of the two walls 12 and 14 forming the peak 16. An opening 18 in the side wall 14 receives a portion of the clip therein. In the usual motor vehicle installation, where the ornamental molding is in the form of a long strip, there would be a plurality of such openings 18 aligned across the vehicle panel and a plurality of clips to secure the strip thereto.

The chrome molding strip, illustrated generally by the numeral 20, in this particular installation extends over the peak 16 formed by the body panel walls 12 and 14. The strip 20 is of generally V-shape, terminating in U-shaped edges 22 and 24. The inner legs 26 and 28 of the U-shaped edges are inwardly turned and bear against the respective peak walls 12 and 14. The molding strip 20 is of a similar configuration to the peak panel.

Figure 2:
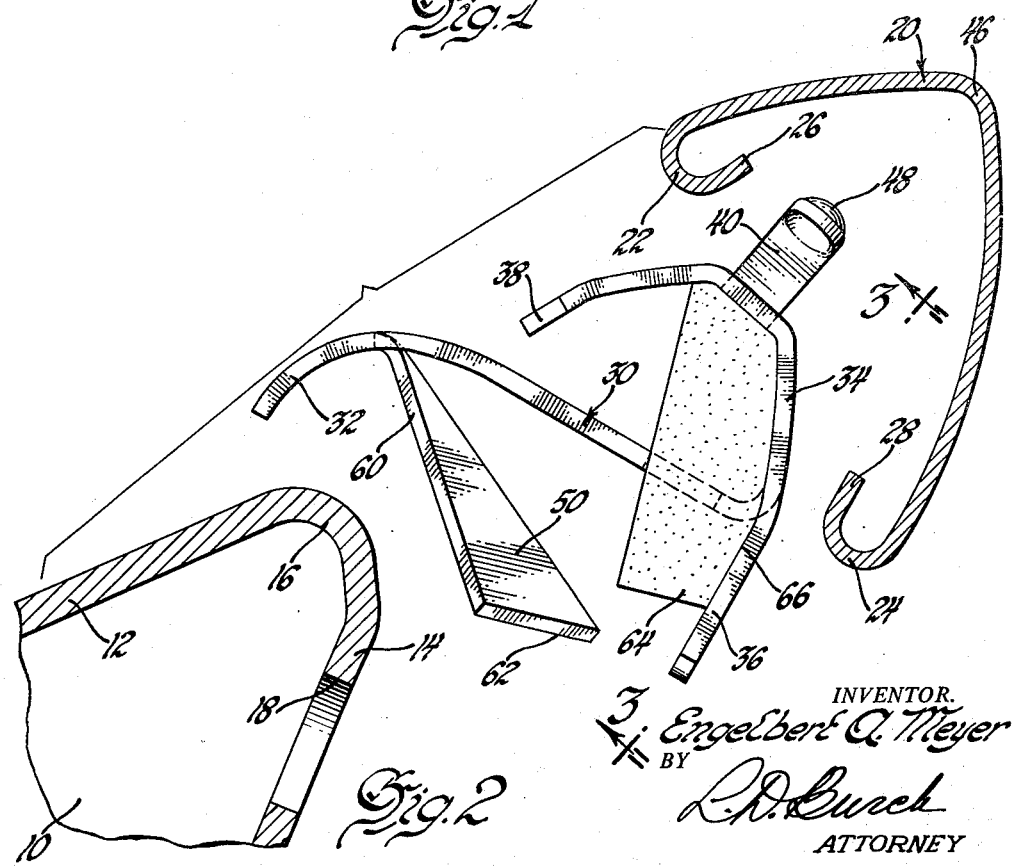
Figure 2 is an exploded view of the structure shown in Figure 1 illustrating the free position of the various parts.
Figure 3:
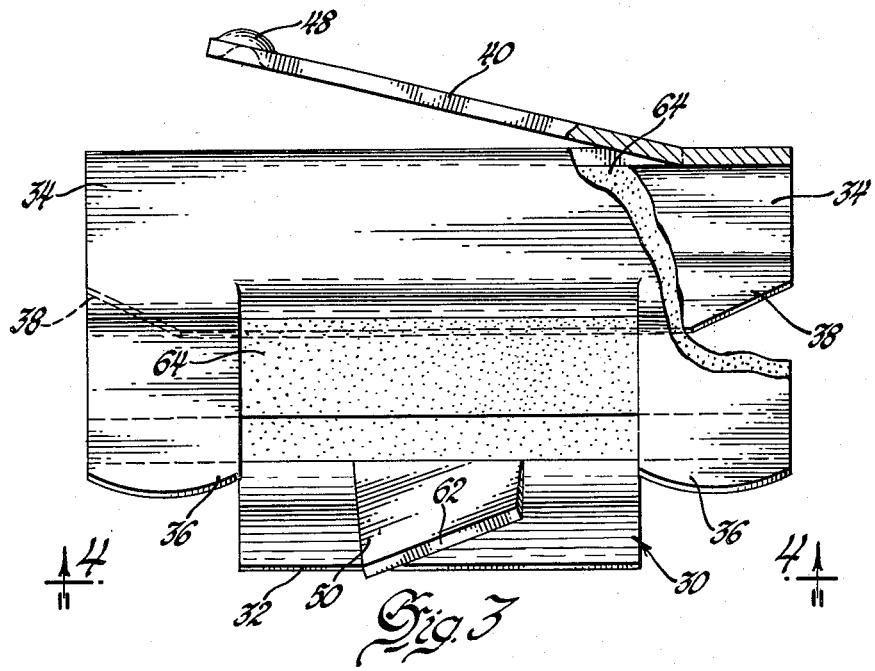
Figure 3 is a side view of the fastener device shown in Figure 2 with parts broken away and in section, the view being taken substantially along the line 3—3 of Figure 2 and looking in the direction of the arrows.
Figure 4:
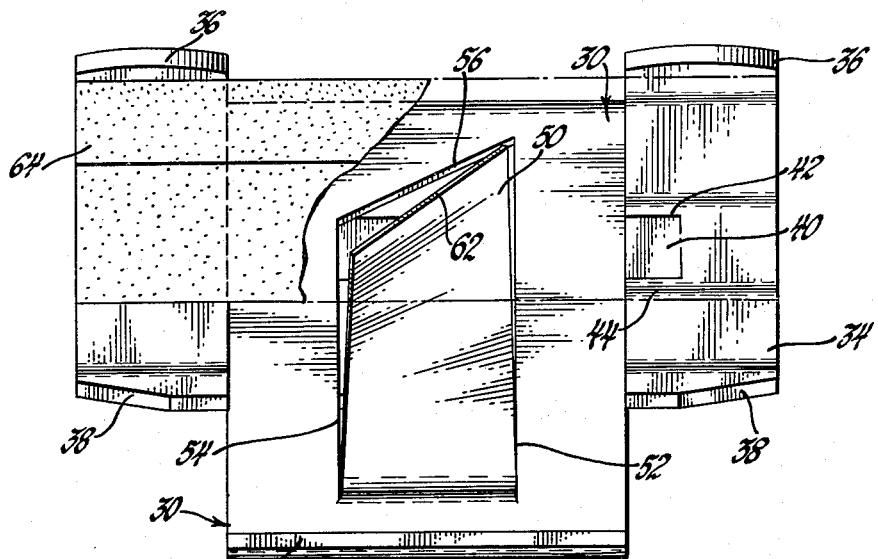
Figure 4 is a bottom view of the fastener device shown in Figure 2 with parts broken away and taken substantially along the line 4—4 of Figure 3.

The fastening device which retains the chrome strip on the vehicle panel is best shown in Figures 2, 3 and 4. The body portion 30, terminates in wall engaging end 32 at one end and extends to the generally U-shaped upper portion 34. The upper portion 34 is wider than the body portion 30, as best illustrated in Figures 3 and 4, the difference in width being in the lower tabs 36. The lower tabs are extensions of the U-shaped upper portion 34 and are adapted to engage the inner leg 28 of the U-shaped edge 24 of the chrome strip 20.

The wall engaging end 32 is arcuately formed, as illustrated in the drawings and it may be seen that the end is adaptable to engage the side wall 12 at the most effective spot regardless of the angularity of the wall. On insertion of the clip through the opening 18, in the wall 14, the arcuate end 32 will slide along the opposite wall 12 to the most effective location to allow the lower finger 50 to put a maximum force between the wall 12 and the opening 18.

The end of the U-shaped upper portion terminates in a broad upper tab 38 which extends substantially along the width of the upper portion and is adapted to engage the leg 26 of the U-shaped edge 22 of the ornamental strip 20. The tab retains the leg 26 against the peak wall 12.

An upper spring finger 40 is struck from the top of the upper portion 34. The finger 40 is formed by slitting the upper portion 34 across the width of the fastener, as along the lines 42 and 44. A third slit connects the slits 42 and 44 at one end thereof to provide the three sided spring finger 40. The finger is then bent outwardly from the upper portion 34 and serves to bear against the vertex 46 of the ornamental clip 20. The spring finger resiliently biases the strip outwardly, assuring engagement between the U-shaped edges 22 and 24 and the tabs 36 and 38 of the fastener. A button 48 may be formed on the free end of the spring finger 40 during the slitting or punching operation if desired, to give better contact between the spring finger 40 and the ornamental strip 20.

A lower finger 50 is formed from the body portion 30 of the fastener in a manner similar to that forming spring finger 40. The body portion 30 is slit along three lines 52, 54 and 56, as best seen in Figure 4, the slit 56 being at an angle to the slits 52 and 54. The lower finger 50 is then bent out of the plane of the body portion 30 and twisted, or canted, with respect thereto, as best illustrated in Figure 3. With the lower finger thus formed, it may be seen in referring to Figure 1, that as the body portion 30 and the end 32 of the fastener are inserted in the opening 18 the lower finger 50 will come to rest in engagement with the inside edge of the opening 18 as at 58. The body portion 30 and the end 32 are thus rigidly held against the interior of the side wall 12, retaining the clip in its proper position. Upon inserting the clip into the opening, it is obvious that the edge 60 of the spring finger 50 will slide along the surface of the opening 18. When properly positioned the edge 62 of the finger 50 will seek its best locating and holding position.

In order to seal the opening 18 and prevent the entrance of moisture and foreign matter into the motor vehicle, a sealing block 64 may be bonded to the upper portion 34 of the fastener, as at 66. The sealing block 64, when the clip is properly installed, will assume a position somewhat similar to that shown in Figure 1 with a portion of the material 68 extending through the opening 18 and into the body peak. The sealing material forms an effective block for any moisture or foreign matter which might pass through the opening 18. The sealing block may be made of any resilient or plastic material, such as vinyl plastisol or the like, which will serve as a suitable seal.

A modification of the fastening device is shown in Figures 5 through 8 and illustrates the versatility of the fastener to applications involving differently shaped molding strips and body panels. The vehicle body 110 is again shown to include side walls 112 and 114, generally intersecting to form a peak 116. A continuation of the body structure 117 prevents the use of a clip of an exact configuration of that shown in Figures 1 through 4. It may be further noted that the opening 118 in the wall 114 is at the opposite side of the peak shown in Figures 1 and 2. The chrome strip is indicated generally by the numeral 120, and is generally of the same configuration as above described having the U-shaped edges 122 and 124 with the legs 126 and 128 adapted to be held against the walls 112 and 114 by the fastening device.

The fastening clip is again comprised of a body portion 130 having an arcuate leg 132 which bears against the interior of the side wall 112. The body portion 130 extends upwardly to the upper fastener portion 134 which has the tabs 136 extending therefrom and on either side of the body portion 130. The tabs 136 engage the leg 128 of the U-shaped edge 124 formed on the ornamental strip 120. The upper tab 138 is an extension, or forms the other leg, of the upper portion 134 and engages the leg 128 of the U-shaped edge 122 formed from the ornamental strip 120.

The wall engaging end 132, being arcuately formed as illustrated, provides the same locating function as previously described in conjunction with the end 32 of the aforementioned modification.

An upper spring finger 140 is provided from the upper portion 134 of the fastener device in a similar manner to the spring finger 40 formed in the clip shown in Figures 1 through 4. A button 148 may be provided on the end of the spring finger 140 to provide better contact between the spring finger 140 and the wall 146 of the chrome strip 120.

Figure 7:
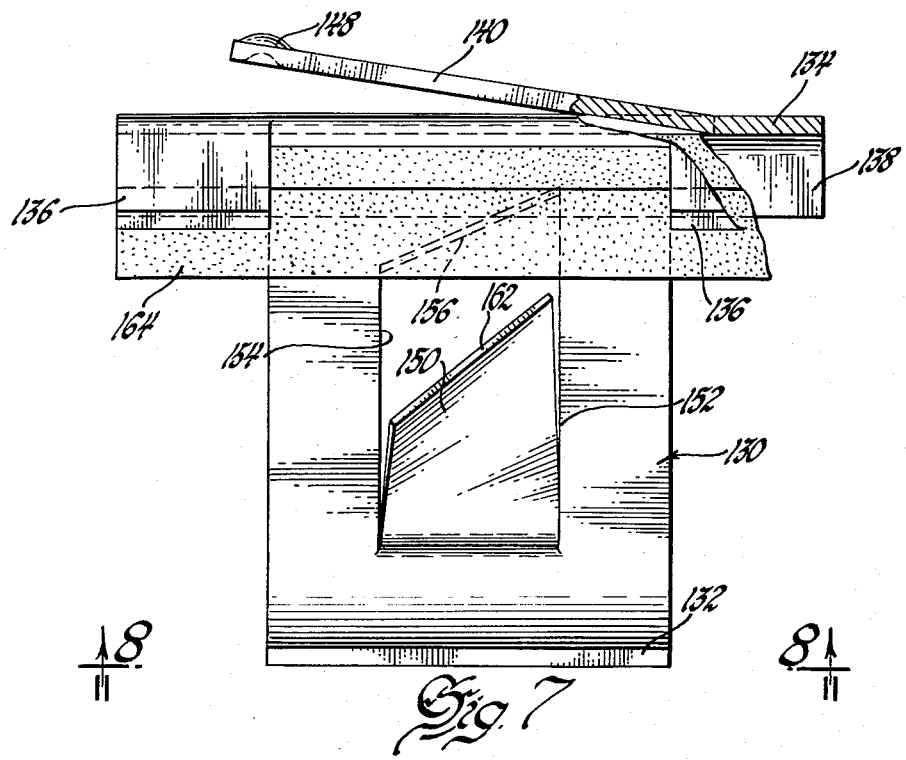
Figure 7 is a side view of the fastener shown in Figure 6 with parts broken away and in section, taken substantially along the line 7—7 and looking in the direction of the arrows.
Figure 8:
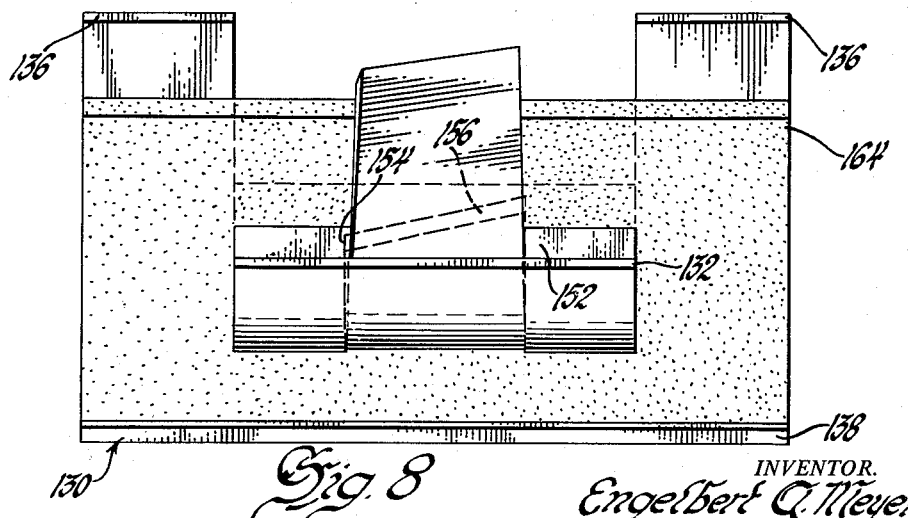
Figure 8 is a bottom view of the fastener shown in Figure 6, taken substantially along the line 8—8 of Figure 7 and looking in the direction of the arrows.

A lower finger 150 is provided from the body portion 130 of the clip, in a similar manner as above described, by slitting the body portion 130 as at 152, 154 and 156. The finger 150 is bent out of the plane of the body portion 130 and twisted, or canted, with respect thereto, as best shown in Figure 7.

Similarly in the clip of Figures 5 through 8, when the body portion 130 and the end 132 are extended through the opening 118 in the wall 114, the edge 160 of the finger 150 will slide along the edge of the opening 118 and the edge 162 will bear against the opening as at 158 when properly positioned therein.

A sealing block 164 may be provided and bonded to the upper portion 134 of the fastener as at 166. When the fastener is inserted in the opening 118, the sealing material will take on a form substantially as that shown in Figure 5 with a portion 168 thereof extending into the opening and providing an effective block for any moisture or foreign matter which might get into the vehicle body through the opening 118.

The claims:

1. In combination with a motor vehicle body having a peak formed thereon and an opening in one wall thereof and adjacent said peak, a molding strip received on the top of said peak and extending downwardly adjacent said opening, and a fastening device engaging said molding strip and having a portion thereof extending through said opening and abutting the opposite wall of said peak and in the interior thereof, a spring finger formed from said portion and extending toward said opening and engaging an interior edge of said opening to secure said fastening device on said peak and to retain said molding strip on said body.

2. In combination with a motor vehicle body having a peak formed thereon and an opening therein adjacent said peak, a molding strip having inwardly turned U-shaped edges and received on the top of said peak and extending downwardly adjacent said opening, a fastening device engaging said molding strip and having a portion thereof extending through said opening and abutting the opposite wall of said peak and in the interior thereof, a spring finger formed from said portion and extending toward said opening and engaging an interior edge of said opening to secure said fastening device on said peak and to retain said molding strip on said body, and sealing means bonded to said fastening device externally of said peak and plugging said opening to prevent the entrance of foreign matter and water into said vehicle body through said peak opening.

3. A fastening device for use in a motor vehicle body having a peak formed thereon and an opening in one wall of said peak and a molding strip receivable over said peak, said fastening device comprising a resilient main portion extendable through said opening and adapted to engage the interior wall of said peak opposite from said opening, means formed from said main portion and adapted to engage said molding strip and retain said strip on said peak, means struck from said main portion and outwardly extending therefrom and engageable with said molding strip intermediately of the edges thereof to bias said strip outwardly from said peak, and means formed from said main portion within said peak and engageable with an edge of said opening to retain said fastening device and said molding strip in and on said vehicle body peak.

4. The fastening device described in claim 3 and further including sealing means bonded to said main portion and adapted to plug said opening in said vehicle body peak and prevent the entrance of water and foreign matter into said peak through said opening.

5. A fastener device for use in a motor vehicle body having a peak formed thereon and an opening in one wall of said peak and a molding strip receivable over said peak, said fastener device comprising a resilient body portion extendable through said opening and adapted to engage the internal surface of the wall of said peak opposite from said wall containing said opening, a resilient U-shaped upper portion extending from said body portion and receivable over said peak, tab means formed from the legs of said U-shaped upper portion and adapted to engage the edges of said molding strip to retain said molding strip in said peak, finger means extending outwardly from said upper portion and engageable with said molding strip to retain said strip in engagement with said tab means, and means formed from said body portion and extending therefrom and engageable with the internal edge of said opening to retain said fastener device and said molding strip on said vehicle body peak.

6. The fastener device defined in claim 5 and further including sealing means bonded to said U-shaped upper portion and adapted to plug said opening in said vehicle body peak and prevent the entrance of water and foreign matter into said vehicle body through said peak opening.

7. In combination with a motor vehicle body having a peak formed thereon and an opening therein adjacent said peak, a molding strip having inwardly turned U-shaped edges and received on the top of said peak and extending downwardly adjacent said opening, and a fastening device engaging said molding strip and received in said opening and retaining said molding strip on said body peak; said fastening device including a resilient body portion extending into said opening and engaging the interior wall of said peak opposite from the wall containing said opening, a resilient U-shaped upper portion extending from said body portion and externally over said peak, an upper tab extending from one leg of said U-shaped upper portion and substantially the width of said fastening device and engaging one of said U-shaped edges of said molding strip and retaining said edge against the wall of said peak opposite from the wall containing said opening, a pair of lower tabs extending from the other leg of said U-shaped upper portion and on either side of said body portion and engaging the other of said U-shaped edges of said molding strip and retaining said edge against the wall of said peak containing said opening, an upper finger struck from the center of said U-shaped upper portion and outwardly extending therefrom and engaging said molding strip intermediately of said edges and resiliently biasing said molding strip outwardly from said peak to maintain said fastening device in engagement with said U-shaped edges of said molding strip, and a lower finger struck from said body portion within said peak and bent out of the plane of said body portion and canted with respect to said body portion, the free end of said lower finger engaging an internal edge of said opening and retaining said body portion in engagement with said internal wall of said peak thereby securing said fastening device on said vehicle body.

8. The combination set forth in claim 7 and further including sealing means of a plastic material bonded to said U-shaped portion of said fastening device and sealing said opening in said vehicle body peak and prevent the entrance of water and foreign matter into said vehicle body through said peak opening.

9. A fastener device for use in a motor vehicle body having a peak formed thereon and an opening in one wall of said peak and a molding strip receivable over said peak, said fastener device comprising a resilient body portion extendable into said opening and engageable with the interior wall of said peak opposite from the wall containing said opening, a resilient U-shaped upper portion receivable over said peak and externally thereof, an upper tab extending from one leg of said U-shaped upper portion and substantially the width of said fastening device and engageable with one of said U-shaped edges of said molding strip to retain said edge against the wall of said peak opposite from the wall containing said opening, a pair of lower tabs extending from the other leg of said U-shaped upper portion and on either side of said body portion and engageable with the other of said U-shaped edges of said molding strip and to retain said edge against the wall of said peak containing said opening, an upper finger struck from the center of said upper portion and outwardly extending therefrom and engageable with said molding strip intermediately of said edges to resiliently bias said molding strip outwardly from said peak and maintain said fastening device in engagement with said U-shaped edges of said molding strip, and a lower finger struck from said body portion receivable within said peak and bent out of the plane of said body portion and canted with respect to said body portion, the free end of said lower finger adapted to engage an internal edge of said opening and retain said body portion in engagement with said internal wall of said peak and to secure said fastening device and said molding strip on said vehicle body.

10. The fastening device set forth in claim 9 and further including sealing means of a plastic material bonded to said upper portion of said fastening device and adapted to plug said opening in said vehicle body and prevent the entrance of water and foreign matter into said vehicle body through said vehicle peak opening.

References Cited in the file of this patent
UNITED STATES PATENTS

| | | |
|---|---|---|
| 2,643,433 | Scott | June 30, 1953 |
| 2,742,984 | Bedford | Apr. 24, 1956 |
| 2,783,513 | Elms | Mar. 5, 1957 |
| 2,837,184 | Fernberg | June 3, 1958 |